Oct. 15, 1940.  J. E. LINDEMAN  2,217,870
SHOCK ABSORBING MECHANISM
Filed April 23, 1938   3 Sheets-Sheet 2

Inventor
James E. Lindeman
By Henry Fuchs
Atty.

Oct. 15, 1940.   J. E. LINDEMAN   2,217,870
SHOCK ABSORBING MECHANISM
Filed April 23, 1938   3 Sheets-Sheet 3

Inventor
James E. Lindeman
By Henry Fuchs
Atty.

Patented Oct. 15, 1940

2,217,870

UNITED STATES PATENT OFFICE 2,217,870

SHOCK ABSORBING MECHANISM

James E. Lindeman, Evanston, Ill., assignor to W. H. Miner, Inc., Chicago, Ill., a corporation of Delaware Application April 23, 1938, Serial No. 203,751

2 Claims. (Cl. 213—40)

This invention relates to improvements in shock absorbing mechanisms especially adapted for railway cars.

One object of the invention is to provide a shock absorbing mechanism wherein both spring and rubber cushioning means is employed to absorb shocks.

Another object of the invention is to provide a shock absorbing mechanism of the character indicated wherein the spring cushioning means includes a coiled spring and the rubber cushioning means is in the form of a coiled member having the coils thereof interposed between and nested with the coils of the spring.

A further object of the invention is to provide a mechanism as set forth in the preceding paragraphs wherein true contact of the engaging faces of the coils of the coiled rubber element and coiled spring is provided by forming the coils of both of these members of material of substantially rectangular cross section.

A still further object of the invention is to provide a shock absorbing mechanism including intercoiled rubber and steel spring elements wherein provision is made for the flow of the material of the rubber element under compression by forming the rubber element with depressions adapted to accommodate the material of said rubber element when compressed.

A more specific object of the invention is to provide an efficient combined steel spring and rubber shock absorbing mechanism of relatively high capacity and of compact design, comprising interwound coiled rubber and steel spring elements surrounding additional separate coiled steel spring elements.

Other objects of the invention will more clearly appear from the description and claims hereinafter following.

Figure 1:
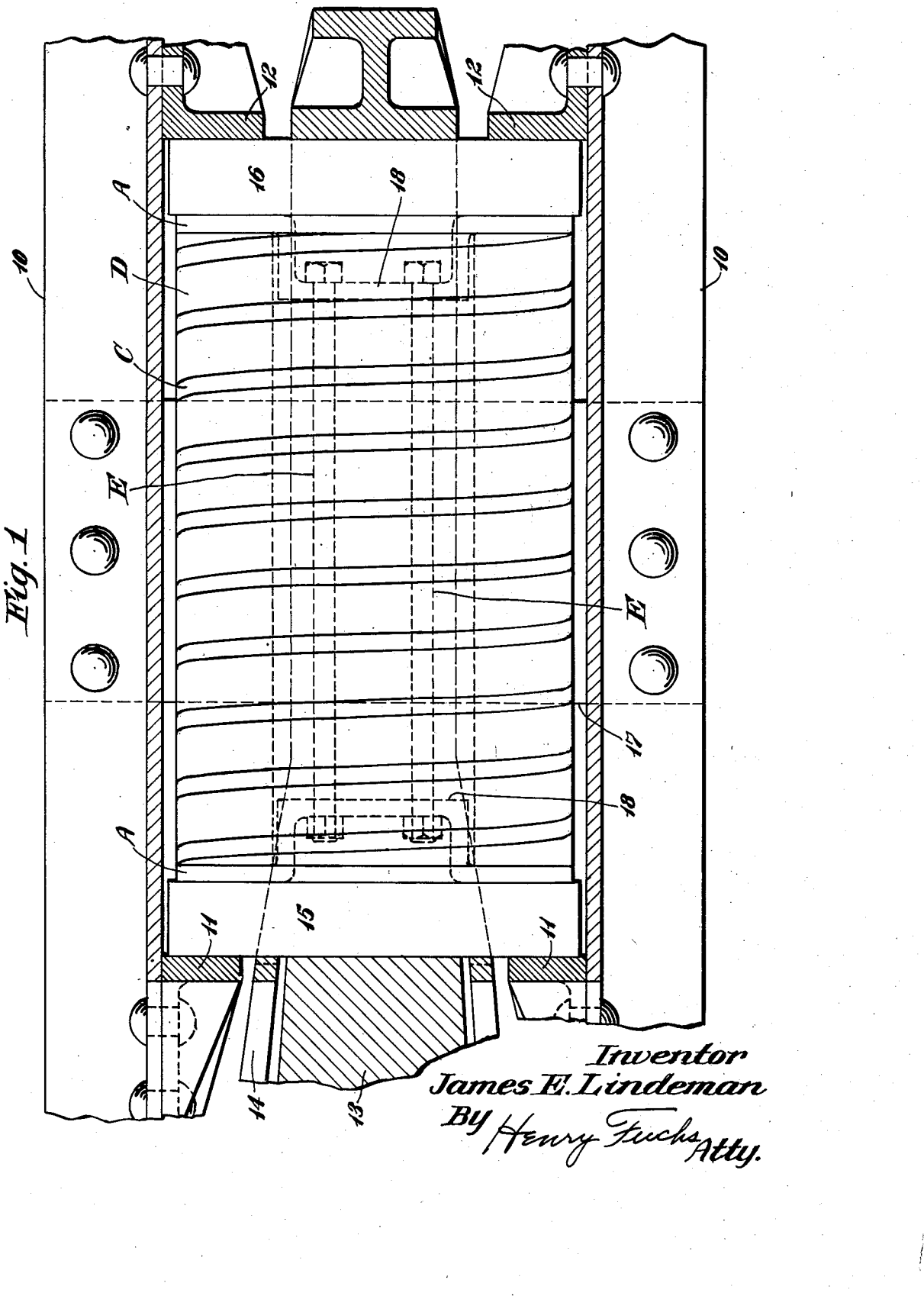
Figure 2:
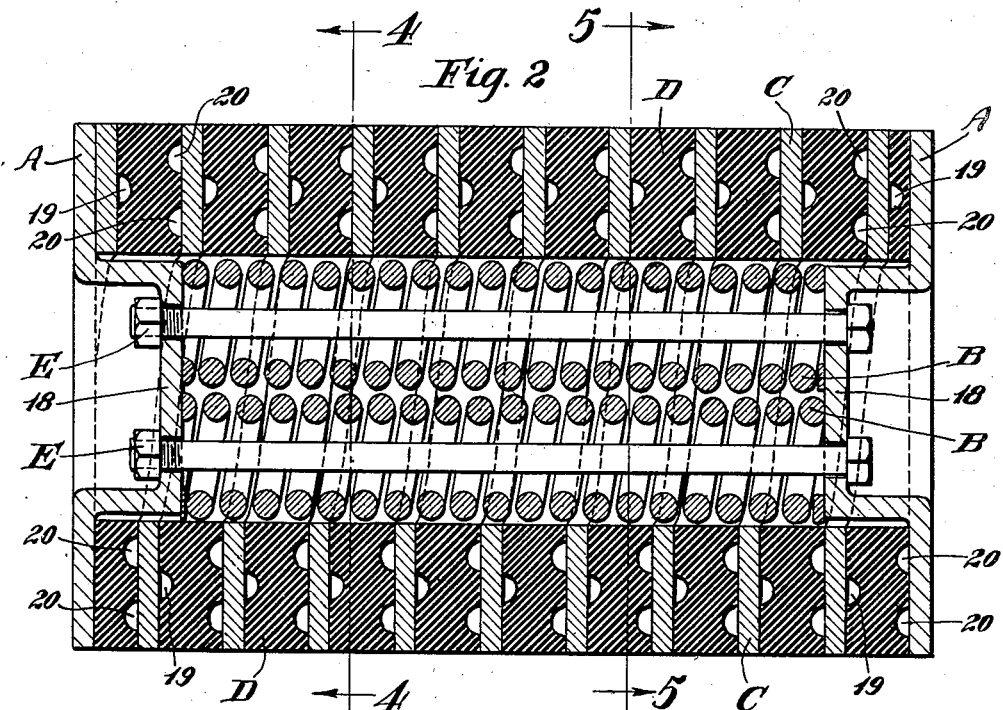
Figure 3:
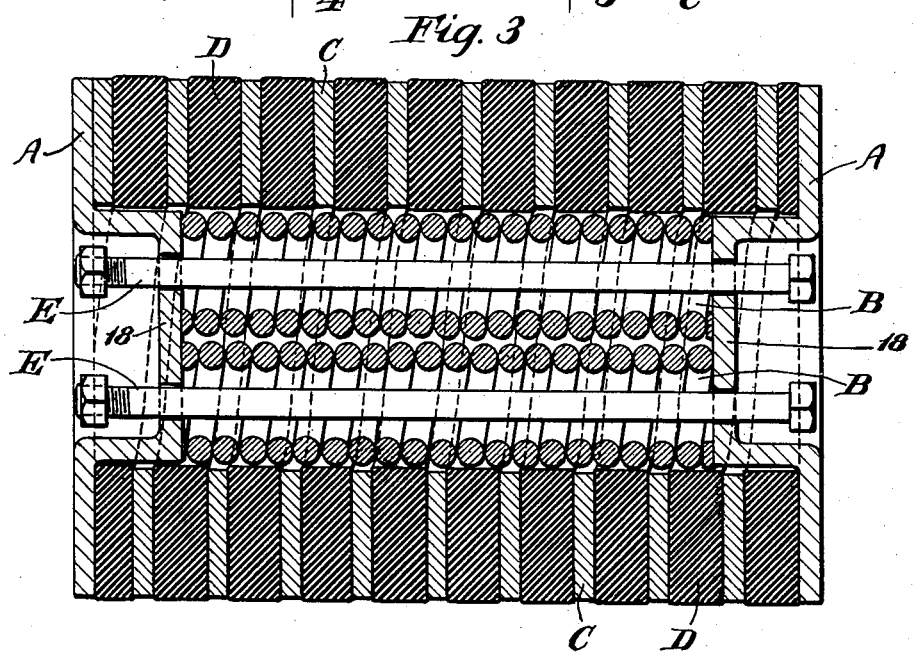
Figure 4:
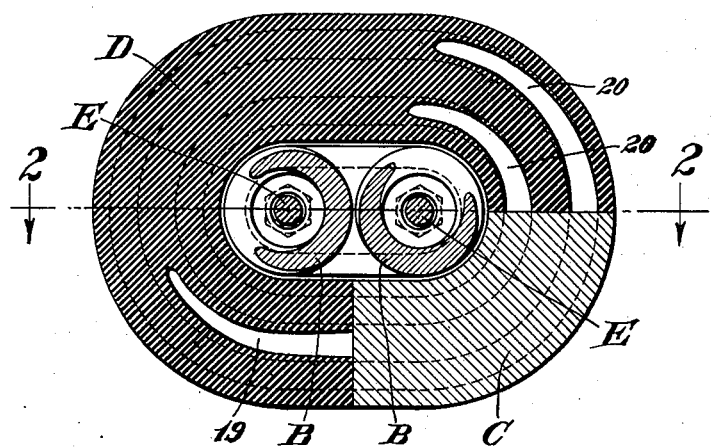
Figure 5:
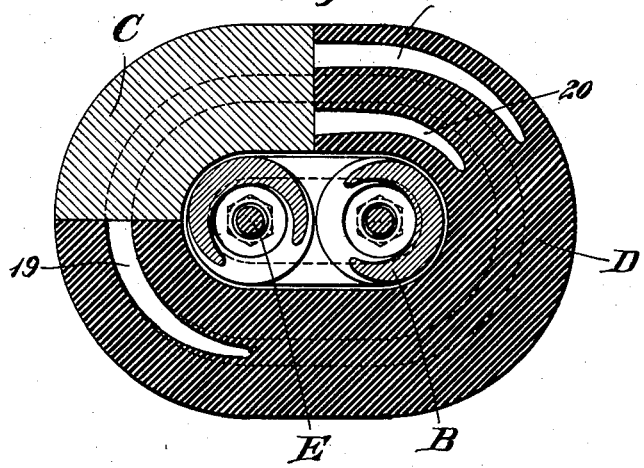

In the drawings forming a part of this specification, Figure 1 is a horizontal sectional view through a portion of the underframe structure at one end of a railway car, illustrating my improved shock absorbing mechanism in connection therewith, the shock absorbing mechanism and the usual front and rear main followers being shown in plan. Figure 2 is a transverse horizontal sectional view of the shock absorbing mechanism shown in Figure 1, the section corresponding substantially to the line 2—2 of Figure 4. Figure 3 is a view similar to Figure 2, illustrating the mechanism compressed. Figures 4 and 5 are transverse vertical sectional views, corresponding respectively to the lines 4—4 and 5—5 of Figure 2.

In said drawings, 10—10 indicate the longitudinally extending center or draft sills of a railway car underframe structure having the usual top and bottom flanges, the flanges at the bottom of the sills only being shown in Figure 1. On the inner sides, the sills are provided with front and rear stop lugs 11—11 and 12—12 commonly employed in railway draft riggings. The rear end portion of the shank of the usual coupler is indicated by 13, to which is operatively connected a yoke 14 of well-known construction. My improved shock absorbing mechanism and cooperating front and rear main followers 15 and 16 are disposed within the yoke, the followers 15 and 16 cooperating respectively with the front and rear stop lugs 11—11 and 12—12 in the usual manner. A saddle plate 17, secured to the bottom flanges of the sills 10—10, underlies the yoke 14 and supports the latter and the parts contained therewithin.

My improved shock absorbing mechanism proper is disposed within the yoke 14 between the front and rear followers 15 and 16 and comprises broadly front and rear spring plates or followers A—A; a pair of coiled steel springs B—B; a helically coiled steel spring C surrounding the springs B—B; a helically coiled rubber element D also surrounding the springs B—B and intercoiled or interwound with the spring C; and a pair of retainer bolts E—E for holding the parts assembled.

The spring plates or spring followers A—A bear on the front and rear followers 15 and 16. These spring plates are of like design, each having a centrally disposed, inwardly projecting, hollow boss 18 forming an abutment for the corresponding ends of the springs B—B.

The springs B—B are helically coiled and arranged side by side lengthwise of the mechanism. The front and rear ends of these springs bear respectively on the bosses 18—18 of the front and rear spring plates or followers A—A.

The spring C is of steel and coiled helically. This spring is made from a flat bar of substantially rectangular cross section and thus the coils thereof present plain front and rear or inner and outer faces.

The rubber element D is also helically coiled and is of greater thickness than the material of the spring C. The element D is intercoiled or interwound with the spring C, that is, the coils of the element D are interposed between the coils of the spring C. The material of the coiled rubber element D is of substantially rectangular cross section whereby the front and rear or inner and outer faces of the coils thereof have true surface contact with the opposed front and rear or inner and outer faces of the coils of the spring C. The spring C and the element D are thus nested, and, in effect, form a unit which serves as a cushioning element. This unit surrounds the springs B—B and is preferably formed of substantially oval, transverse shape, as clearly shown in Figures 4 and 5, thus closely fitting about the springs B—B. The bosses 18—18 on the spring plates or followers A—A are of oval, transverse outline and correspond with and loosely project into the opposite ends of the units formed by the coils C and D. The plates A—A are also preferably of oval outline to fit the ends of the unit C—D which bear thereon. As will be evident, the unit C—D may be made of any other cross sectional shape desired and if a single central coil spring is employed in the mechanism instead of two springs, as shown, the unit C—D may be made of circular cross sectional shape to conform to the circular cross section of the central spring element.

As shown most clearly in Figures 2, 4, and 5, the forward surface of the entire helical coil of the rubber element is provided with a central groove 19 and the rearward surface thereof with a pair of spaced grooves 20—20. These grooves are continuous throughout the length of the element D and serve to accommodate displacement or flow of the rubber material of which the element D is composed when the coils of this member are compressed between the coils of the spring C. As will be evident, the coils C and D are, in effect, interengaged so that they are in threaded relation with each other.

The mechanism is held assembled and of uniform overall length by the retainer bolts E—E which extend respectively through the two coiled springs B—B and openings in the spring plates A—A and have their opposite ends anchored to these plates. The bolts are preferably adjusted in such a manner as to hold the mechanism under a predetermined initial compression.

The operation of my improved shock absorbing mechanism is the same in either buff or draft, compression thereof being effected by relative movement of one of the main followers of the draft rigging toward the other. In draft action, the coupler 13 is moved outwardly carrying the yoke 14 therewith and pulling the main follower 16 forwardly toward the main follower 15, which is held stationary by the front stop lugs 11—11, and in buff the coupler is forced rearwardly carrying the front main follower 15 rearwardly therewith toward the main follower 16 which at that time is held stationary by the rear stop lugs 12—12. Upon movement of either main follower toward the other, the shock absorbing mechanism will be compressed, the rear follower plate A being moved forwardly in draft by the main follower 16 and the front follower plate A being held stationary by the front main follower 15, and the front follower plate A being moved rearwardly with the front main follower 15 in buff, while the rear follower plate A is held stationary by the rear main follower 16. During relative approach of the main followers 15 and 16 and the follower plates A—A, all of the springs B—B and C and the helical rubber element D will be compressed, the material of the rubber element being compressed between the inner and outer flat surfaces of the helical coil C. Displacement of the material of the rubber element D is accommodated by the grooves 19 and 20—20 therein. This action continues until the mechanism is fully compressed, as shown in Figure 3. Upon reduction of the actuating force, the tendency of the springs to expand and of the rubber element to assume its normal original shape forces the follower plates A—A and the main followers 15 and 16 apart, thereby returning all of the parts of the mechanism, including the main followers 15 and 16 and other parts of the draft rigging to the normal full release position shown in Figure 1, outward movement of the follower plates A—A being limited by the retainer bolts E—E.

I have herein shown and described what I now consider the preferred manner of carrying out my invention, but the same is merely illustrative and I contemplate all changes and modifications that come within the scope of the claims appended hereto.

I claim:

1. In a shock absorbing mechanism, the combination with a pair of spring followers relatively movable toward and away from each other; of a central pair of longitudinally disposed coil springs between said spring followers, said springs being of circular cross sectional outline and arranged side by side; and a cushioning unit of substantially oval interior and exterior cross section surrounding said springs, said unit being interposed between said spring followers, said unit comprising interwound helical rubber and steel spring elements.

2. In a shock absorbing mechanism, the combination with a pair of spring followers relatively movable toward and away from each other; of a pair of longitudinally disposed coil springs between said followers, said coil springs being of circular cross section and arranged side by side; a helical steel spring surrounding said pair of coil springs and interposed between said spring followers, said spring being formed of material of rectangular cross section; a helical rubber spring also surrounding said pair of coil springs and interwound with said steel spring, said rubber spring being formed of material of rectangular cross section, said interwound steel and rubber springs being of oval contour transversely of the mechanism to closely embrace said pair of coil springs; and retainer means limiting separation of said spring followers.

JAMES E. LINDEMAN.